April 24, 1962   J. E. FINLEY   3,031,620
GALVANOMETER
Filed April 16, 1959
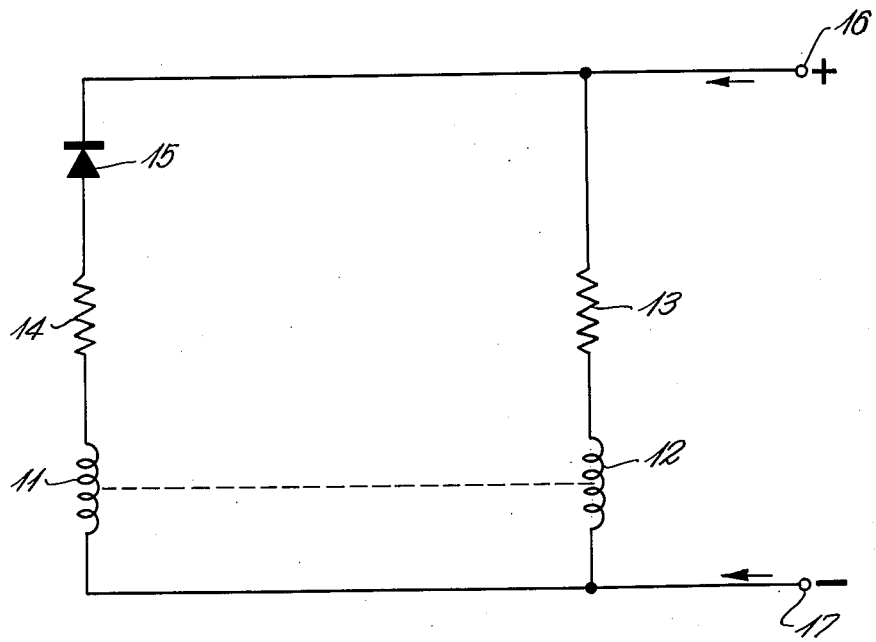
INVENTOR
*James E. Finley*
BY *Stevens, Davis, Miller & Mosher*
ATTORNEYS

United States Patent Office 3,031,620
Patented Apr. 24, 1962

3,031,620
GALVANOMETER
James E. Finley, Bellaire, Tex., assignor to Texas Instruments Incorporated, Dallas, Tex., a corporation of Delaware
Filed Apr. 16, 1959, Ser. No. 806,915
1 Claim. (Cl. 324—131)

This invention relates to an expanded scale galvanometer with proportionately amplified absolute accuracy.

In expanded scale galvanometers of the prior art, the expanded scale operation is obtained by either mechanically biasing the galvanometer spring so that the galvanometer does not move on scale until a predetermined input signal is applied or by use of a constant bucking current. When mechanical biasing is used, the accuracy of the reading on the expanded scale is not proportionally amplified. For example, suppose that the galvanometer has an accuracy of 1% and mechanical biasing is used to obtain an expanded scale reading between 100 and 110 volts. A 1% error in the reading would be 1 volt, which would be 10% of the scale. In the present invention, this error would still be only 1%, or 0.1 volt, in the expanded scale range. Another method of the prior art of obtaining an expanded scale is to use a bucking current. In this case, the accuracy is dependent upon the accuracy of the bucking current, and any error in the bucking current will cause a magnified error in the expanded scale.

According to the present invention, the moving coil of the galvanometer is wound as two coils. Mechanically, the two coils are one unit. The two coils are connected so that the torques generated by the coils are opposed. The net torque for the galvanometer deflection will be the difference between the torques produced by each of the coils. The circuit includes a Zener diode which limits the current through one of the two galvanometer coils to the back current of the Zener diode when the input signal is below the range to be monitored. Under these conditions, the deflection of the galvanometer is controlled for the most part by the current flowing through the other coil. When an input signal in the range to be monitored is applied, the Zener diode will break down, and a greater current will flow through the coil in series with the Zener diode, thus causing an increase in the opposing torque. The total torque applied to the meter movement will then be effectively controlled by the currents flowing through both of the coils, which currents are flowing in opposite directions. The Zener diode will provide a constant voltage drop in the series circuit of one of the coils. The linear resistance of this circuit is selected to be less than the resistance of the series circuit containing the other coil. The accuracy of the indication will be limited only by the original accuracy of the galvanometer and the preciseness of the constant voltage drop provided by the Zener diode. Since Zener diodes provide a very precise constant voltage drop, the accuarcy of the galvanometer in the expanded scale will be substantially determined by the original accuracy of the galvanometer and this accuracy will be amplified proportionally on the expanded scale.

Further objects and advantages of the invention will become apparent as the following detailed description of the invention unfolds and when taken in conjunction with the single figure of the drawing which shows the circuit of the invention.

As shown in the figure, the galvanometer circuit comprises two coils 11 and 12. The two coils 11 and 12 are fixed together and are mechanically one unit. The two coils 11 and 12 comprise the moving part or moving coil of the galvanometer and are rotatably mounted as in a conventional galvanometer. Connected in series with the coil 12 is a resistor 13. A resistor 14 and a Zener diode 15 are connected in series with the coil 11. The series circuit of the coil 12 and the resistor 13 is connected in parallel with the series circuit of the coil 11, the resistor 14 and the diode 15. This parallel circuit is connected across signal input terminals 16 and 17. The signal voltage to be measured by the galvanometer is impressed across the terminals 16 and 17 with the plus side of the voltage always being applied to the terminal 16. The polarity of the Zener diode 15 is chosen such that it will oppose current flow through the coil 11. The Zener diode comprises a non-linear impedance which has a high resistance when a voltage below its breakdown voltage is applied thereacross and a constant voltage drop when a voltage above its breakdown voltage is applied thereacross. The resistances of the resistors 13 and 14 are chosen such that the sum of the resistances of the coil 12 and resistor 13 is greater than the sum of the resistances of the coil 11 and resistor 14.

In this circuit, the only current which will flow through the coil 11 when the input signal is below the breakdown voltage of the Zener diode 15, is the back current through the diode 15. Therefore, the deflection of the galvanometer will be controlled mostly by the current flowing through the coil 12, as the small back current flowing through coil 11 will generate little opposing torque. When the current flowing through the coil 12 is greater than the current flowing through the coil 11, the galvanometer needle will be caused to deflect in what shall be termed the negative direction. Thus, when no current is flowing through either coil, the needle will rest at the zero indication on the scale, and then when a positive voltage less than the breakdown voltage of the Zener diode 15 is applied to the input terminals 16 and 17 of the galvanometer, the current flowing through the coil 12 will exceed the current flowing through the coil 11, and as a result, the galvanometer needle will be driven off scale (the negative direction) and towards a stop pin which resides to the left of the zero indication on the meter scale. This indicates that the input voltage is below the values suitable for the expanded scale range. With higher input signal voltages, the Zener diode 15 will break down and allow substantial current to flow through the coil 11. This increased current will generate increased torque to oppose that generated by coil 12. When the Zener diode 15 is broken down, appreciable current will flow through the coil 11. The Zener diode 15 will provide a constant voltage drop in series with the resistor 14 and the coil 11. When the value of the signal input voltage applied to terminals 16 and 17 is a relatively small amount above this constant voltage drop, more current will flow through the coil 12 than through the coil 11. This is because the constant voltage drop across the diode 15 causes less voltage to be placed across the resistor 14 and coil 11 than across the resistor 13 and the coil 12. Thus, even though the resistance of resistor 14 and coil 11 is less than that of resistor 13 and coil 12, the current flowing through coil 11 will be less than that flowing through coil 12 for input voltages slightly above the Zener breakdown voltage of the diode 15 on account of the greater voltage drop across resistor 13 and coil 12. The deflection of the galvanometer will still be in the direction in which the torque generated by coil 12 is applied, i.e. in the negative direction. As the input voltage applied to terminals 16 and 17 is increased still further, the voltage drop applied across the resistor 14 and coil 11 is increased because the voltage drop across the diode 15 remains constant. Although the voltage drop across resistor 13 and coil 12 is also increased, because the resistance of the resistor 14 and the coil 11 is less than the resistance of the resistor 13 and the coil 12, the increase in current through coil 11 will be greater than the increase through coil 12 for a given increase in input voltage. Because the current through coil 11 increases more rapidly than current through coil 12 with increases in input voltage, the excess of current flowing through coil 12 over that flowing through coil 11 will decrease, and this will apply to the galvanometer needle a decreased amount of torque in the negative direction. The needle will now tend to return to its original, or zero, position. As the input voltage applied to terminals 16 and 17 is increased still further, a point will be reached where the currents through coils 11 and 12 are equal, and at this time the needle will point to the zero position on the scale. As still greater input voltages are applied, more current will flow through coil 11 than will flow through coil 12, and this will apply torque to the galvanometer in the positive direction, i.e. the direction in which the galvanometer will operate on the expanded scale. The deflection will now vary linearly, and on scale, in the positive direction with increasing input signal voltage, and the galvanometer will operate in its expanded scale range.

With this arrangement, the total deflection on the expanded scale is controlled by the input signal voltage applied to terminals 16 and 17, the torque generated by the coils 11 and 12, and the constant voltage drop provided by the Zener diode 15. Since the constant voltage drop across the Zener diode 15 is very precise, the accuracy of the indication will depend substantially only upon the accuracy of the galvanometer itself. Any error in the galvanometer reading on the expanded scale will have substantially the same absolute value as the error obtained for the same deflection if the galvanometer were not operating on expanded scale. Thus, the accuracy of the indication is amplified. For example, suppose that the error of the galvanometer were 1% of the deflection. Thus, an indication of 20 volts would have an error of 0.2 volt if the galvanometer were operated on a normal scale. On the expanded scale operation, suppose that a zero deflection indicates 100 volts. The deflection indicating 20 volts on the normal scale will then indicate 120 volts on the expanded scale. The error will still be 0.2 volt. Thus, the accuracy is amplified to ⅙ of 1%.

The above description is of a preferred embodiment of the invention, and many modifications may be made thereto without departing from the spirit and scope of the invention which is to be limited only as defined in the appended claim.

What is claimed is:

In a galvanometer of the type having a first moving coil, the improvement comprising a second moving coil oppositely wound to said first moving coil and fixed thereto for rotation therewith, a first series circuit including said first moving coil and a first resistor, a second series circuit including said second moving coil, a Zener diode and a second resistor, said second series circuit being connected in parallel with said first series circuit, the combined linear impedance of said first moving coil and said first resistor in said first series circuit being greater than the combined linear impedance of said second moving coil and said second resistor in said second series circuit, whereby the application to said first and second series circuits in parallel of a voltage sufficient to render said Zener diode conductive produces currents in said circuits that generate opposing torques in said moving coils, both coils rotating in response to the net effective torque generated by both of said moving coils.

References Cited in the file of this patent

UNITED STATES PATENTS

| | | |
|---|---|---|
| 2,459,081 | Kunz | Jan. 11, 1949 |
| 2,526,329 | Chamberlain | Oct. 17, 1950 |
| 2,747,161 | Dreyer | May 22, 1956 |

FOREIGN PATENTS

| | | |
|---|---|---|
| 780,118 | Great Britain | July 31, 1957 |